(12) United States Patent
Meichtry

(10) Patent No.: US 11,927,461 B2
(45) Date of Patent: Mar. 12, 2024

(54) MAGNET HOLDER AND SENSOR BRACKET SYSTEM

(71) Applicant: MULTI-FAB PRODUCTS, LLC, Menomonee Falls, WI (US)

(72) Inventor: Michael Meichtry, Brookfield, WI (US)

(73) Assignee: MULTI-FAB PRODUCTS, LLC, Menomonee Falls, WI (US)

( * ) Notice: Subject to any disclaimer, the term of this patent is extended or adjusted under 35 U.S.C. 154(b) by 23 days.

(21) Appl. No.: 17/873,250

(22) Filed: Jul. 26, 2022

(65) Prior Publication Data
US 2024/0035862 A1 Feb. 1, 2024

(51) Int. Cl.
*G01D 11/24* (2006.01)
*G01D 5/12* (2006.01)

(52) U.S. Cl.
CPC .............. *G01D 11/245* (2013.01); *G01D 5/12* (2013.01)

(58) Field of Classification Search
CPC .......... G01D 5/14; G01D 5/142; G01D 5/145; G01D 5/147; G01D 2205/20; G01D 11/245; G01D 5/12; G01D 11/24; G01D 5/24442; H02K 5/04; G01R 15/207; G01R 33/072; G01R 33/091; G01R 33/0047
See application file for complete search history.

(56) References Cited

U.S. PATENT DOCUMENTS

| | | | |
|---|---|---|---|
| 5,457,384 A | 10/1995 | Alfors | |
| 5,675,250 A * | 10/1997 | Berglund | G01D 5/145 |
| | | | 324/207.2 |
| 2005/0215328 A1 * | 9/2005 | Endou | F16D 3/72 |
| | | | 464/78 |
| 2010/0038166 A1 | 2/2010 | Chandran et al. | |
| 2011/0065317 A1 * | 3/2011 | Shaw | H01R 9/0524 |
| | | | 439/578 |

(Continued)

FOREIGN PATENT DOCUMENTS

CN 207009188 2/2018

OTHER PUBLICATIONS

"Engineering Product Design, Knowledge base tab, What is a key and keyway", p. 1, available on Mar. 23, 2022 at https://web.archive.org/web/20220323200021/https://engineeringproductdesign.com/knowledge-base/keys-keyways/ (Year: 2022).*

(Continued)

*Primary Examiner* — Daniel R Miller
*Assistant Examiner* — Edgar I Jimenez
(74) *Attorney, Agent, or Firm* — Erin Ella Block; DeWitt LLP

(57) ABSTRACT

The present magnet holder and magnetic sensor bracket provide a robust, easily repaired magnet-and-sensor system. The axle extending through the holder and bracket is easily aligned in a shaft collar in the holder by an interlocking keyway. A slot extending through the collar allows deformation of the split collar to accommodate over-rotation without damage to the collar. The magnet assembly in the holder is held in place based on magnetic attraction, allowing both easy assembly and replacement. Likewise, the potential sensor attachment methods allow easy, rapid fabrication and replacement using assemblies with split sensor channels and retaining rings.

18 Claims, 4 Drawing Sheets

(56) References Cited

U.S. PATENT DOCUMENTS

2014/0183315 A1* 7/2014 Lindstrom ................ F16K 1/22
 248/314
2015/0358736 A1* 12/2015 Wang ..................... H04R 9/025
 381/412
2019/0044417 A1 2/2019 Yamamoto et al.

OTHER PUBLICATIONS

"First4Magnets Frequently Asked Questions", p. 12, available on May 17, 2022 at http://web.archive.org/web/20220517080931/https://www.first4magnets.com/us/tech-centre-i1093/frequently-asked-questions-i1402 (Year: 2022).*

"OurPCB, PCB: Key Applications and Type", p. 2, available on Jun. 29, 2022 https://web.archive.org/web/20220629041243/https://www.ourpcb.com/pcb-glue.html (Year: 2022).*

Https://www.performancebike.com/specialized-speed-sensor-magnet-holder-black-centerlock-s226800004/p1342104, accessed Oct. 18, 2022.

Https://www.rexelusa.com/p/40385/allen-bradley/proximity-sensor-30mm-lock-washer-2-washers-per-set/662468326483/871a-lwn30, accessed Oct. 18, 2022.

* cited by examiner

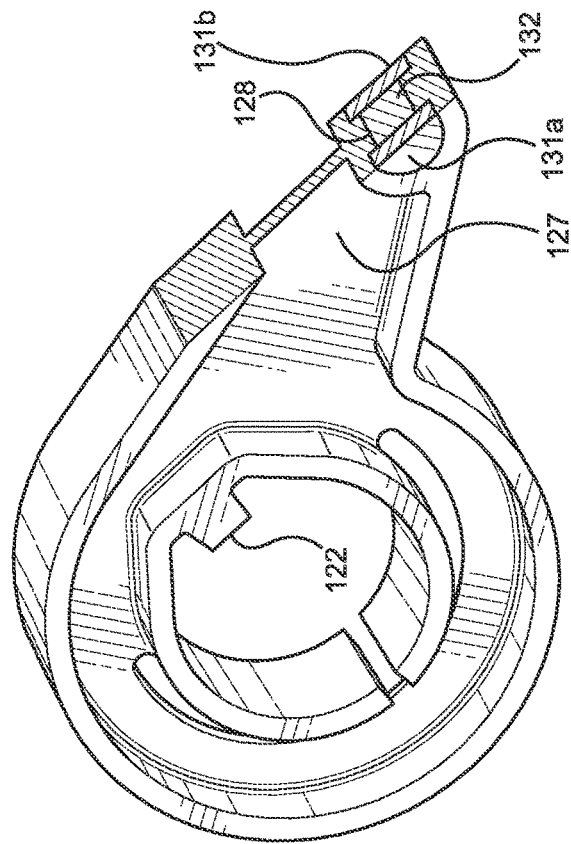
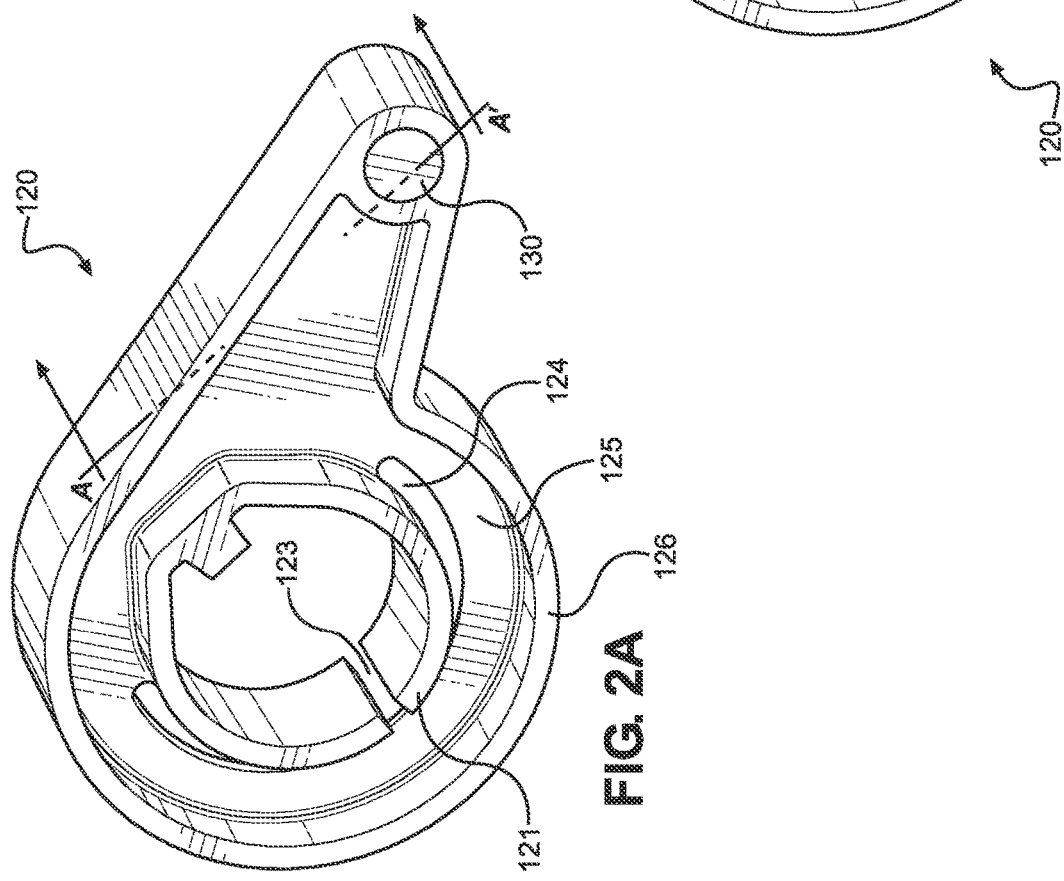
FIG. 2A
FIG. 2B

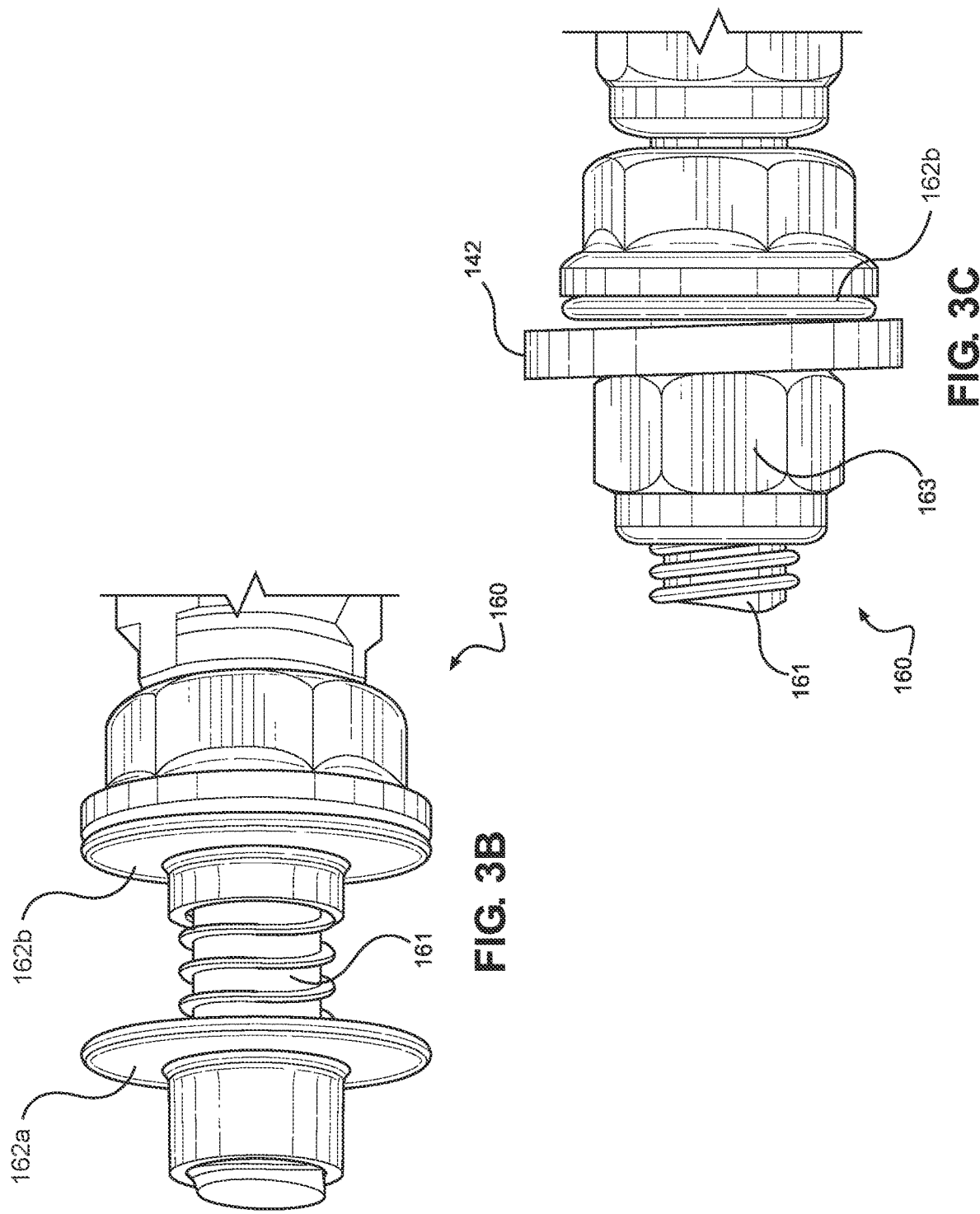

MAGNET HOLDER AND SENSOR BRACKET SYSTEM

BACKGROUND OF THE INVENTION

The present disclosure is directed to a magnetic sensor system, and more specifically to a system for detecting angular position.

Magnetic sensors are well-known in the transportation industry, providing information on rotational speed and position of various vehicle and vehicle-adjacent components. Such sensors operate by detecting the position of a magnet and are known for both their low cost and their ruggedness. Unfortunately, given the likelihood of large-force impacts from vehicles, the bracket settings used to position the sensors and magnets are frequently at risk of damage and/or misalignment. Compounding this is the likelihood of settings being exposed to inclement and extreme weather conditions, and the necessity for rapid repair, sometimes at the hands of workers unskilled in complex repairs.

There is an unmet need in the art for a robust, easily repaired magnet-and-sensor bracket system which is not subject to damage or misalignment due to weather.

BRIEF SUMMARY

The present invention is a magnet holder and sensor bracket system. The system includes a magnet holder and a sensor bracket. The magnet holder includes a shaft collar configured to conform to an outer surface of an axle shaft, a holder web encircling the shaft collar, a magnet extension extending from the holder web, a magnet channel extending through the magnet extension, and a magnet assembly located within and extending through the magnet channel. The sensor bracket includes a shaft bore, the axle shaft extending therethrough, a bracket web encircling the shaft bore, at least one sensor channel extending from the bracket web, and at least one magnetic sensor located in the at least one sensor channel.

BRIEF DESCRIPTION OF THE DRAWING(S)

FIG. 2a is a perspective view of an embodiment of the magnet holder. FIG. 2b is a partially cut away perspective view of the magnet holder of FIG. 2a along the A-A' line.

Figure 3A:
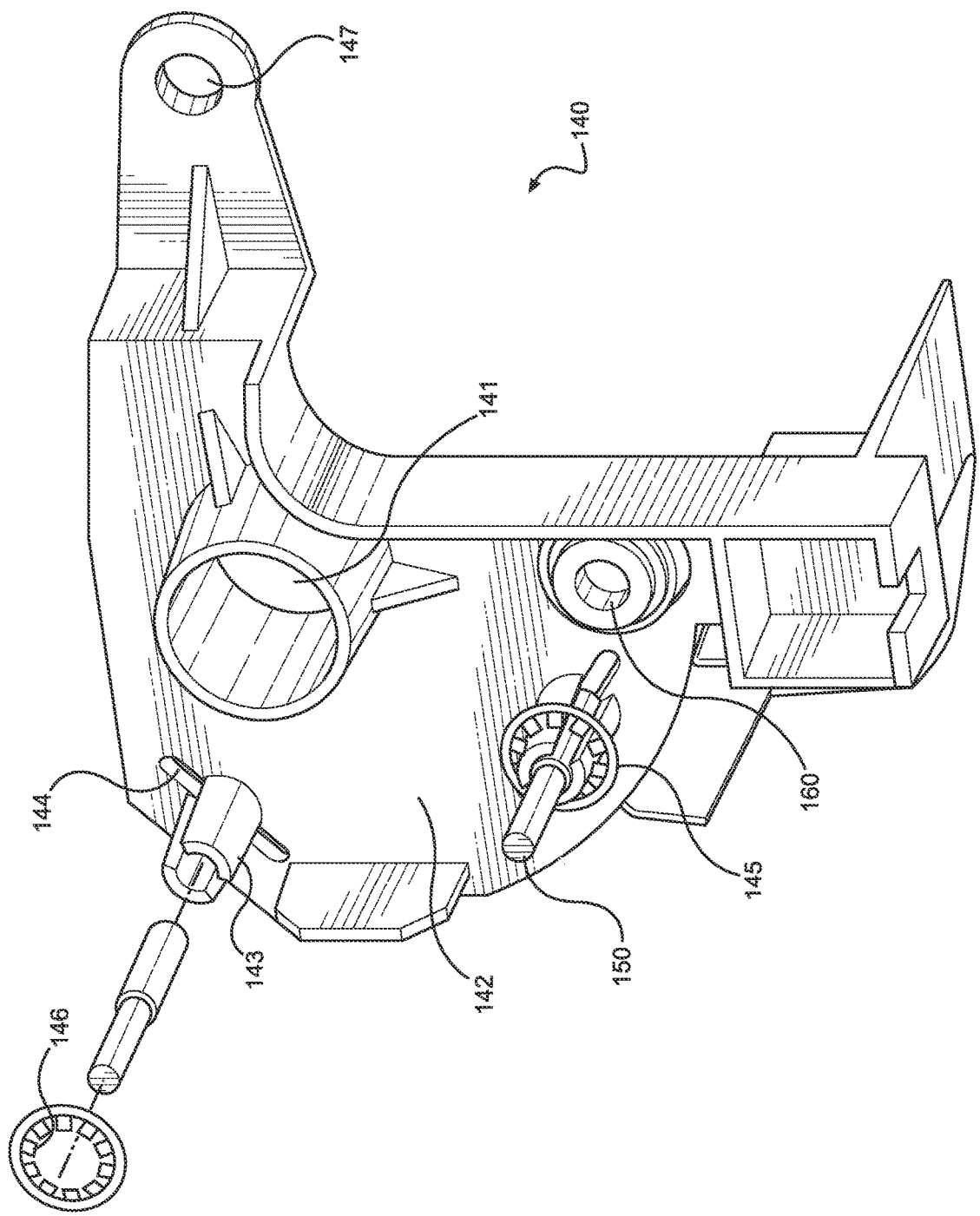

FIG. 3a is a partially exploded perspective view of an embodiment of the sensor bracket. FIG. 3b is a side view of the anchor assembly during installation of the sensor bracket. FIG. 3c is a side view of the anchor assembly after installation of the sensor bracket.

It should be understood that for clarity, not every part is labeled in every drawing. Lack of labeling should not be interpreted as a lack of disclosure.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
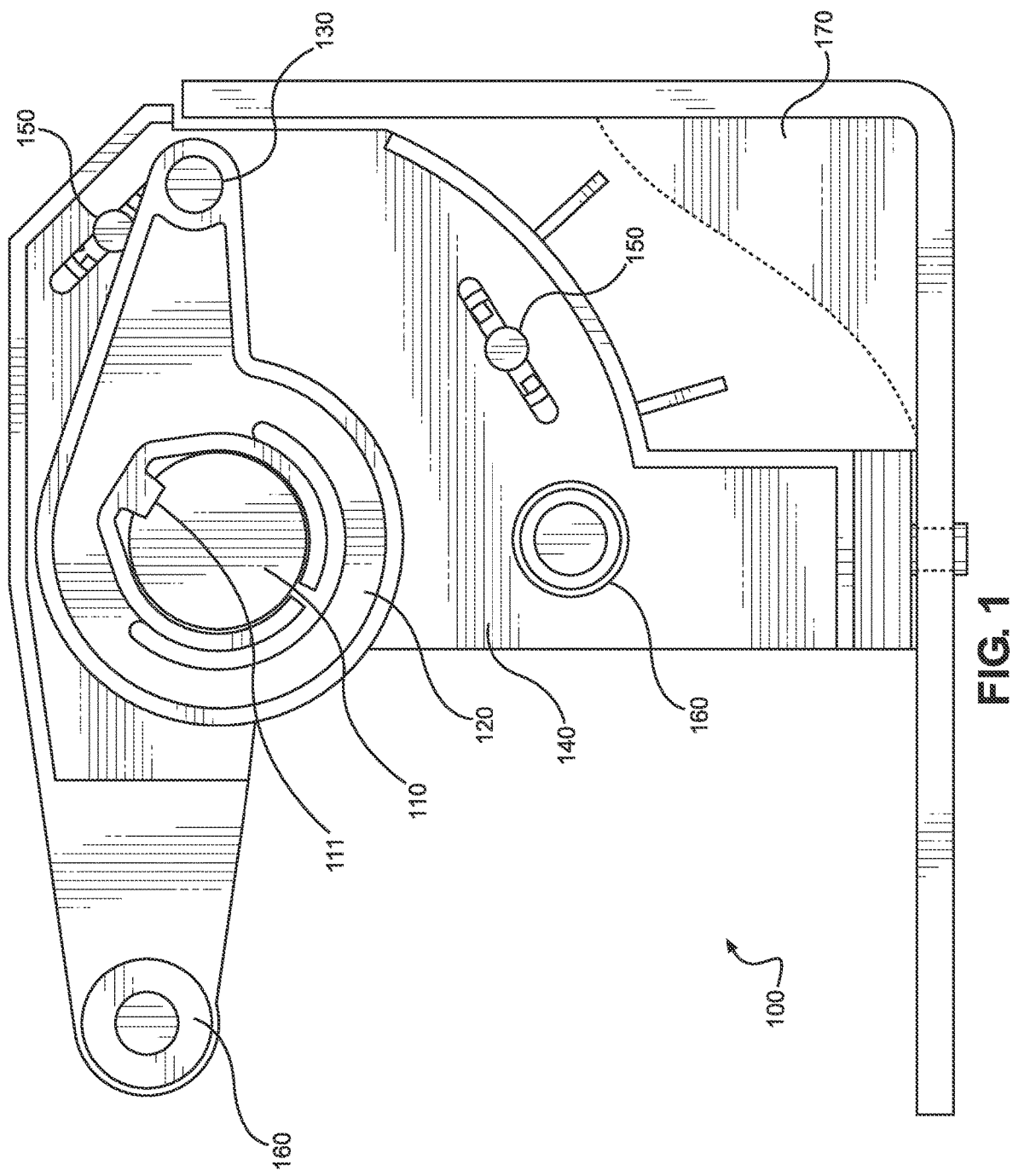
FIG. 1 is a side view of an embodiment of the magnet holder and sensor bracket system.

As seen in FIG. 1, the magnet holder and sensor bracket system 100 includes a magnet holder 120 and a sensor bracket 140. Both the magnet holder 120 and the sensor bracket 140 may be manufactured from a semi-rigid polymer. The magnet holder 120 is mounted to an axle shaft 110, which extends through the sensor bracket 140 and allows the magnet holder 120 to rotate relative to the sensor bracket 140. In certain embodiments, the axle shaft 110 may be the axle of the Vehicle Restraining Hook System of the commonly-owned U.S. Pat. No. 11,254,526, the contents of which are incorporated herein in their entirety.

A magnet assembly 130 is removably mounted to the magnet holder 120, while at least one magnetic sensor 150 is removably mounted to the sensor bracket 140. The mounting locations of the magnet assembly 130 and the magnetic sensor 150 on the magnet holder 120 and the sensor bracket 140, respectively, are positioned such that rotation of the axle shaft 110 moves the magnet assembly 130 into and out of sensing proximity with the magnetic sensor 150. In various embodiments, moving the magnet assembly 130 into or out of sensing proximity with the magnetic sensor 150 triggers an external element operatively coupled to the magnetic sensor 150 but otherwise outside of system 100. The magnet holder 120 and the sensor bracket 140 may be enclosed by a bracket cover 170 to prevent dirt, water, or other debris from adversely affecting the system 100.

As can be seen in FIG. 2a, the magnet holder 120 includes a shaft collar 121 at least partially encircled and connected to a web periphery 126 by a holder web 125. The shaft collar 121 is a channel substantially conforming to the outer surface of the axle shaft 110. In embodiments where the axle shaft 110 incorporates a shaft keyway 111, the shaft collar 121 incorporates a matching keyway protrusion 122 interlocking with the shaft keyway 111. The interlocking relationship maintains the angular alignment of axle shaft 110 with the magnet holder 120 during rotation of both. In instances of over-rotation which cause the keyway protrusion 122 to become dislodged from the shaft keyway 111, the proper angular alignment between the magnet holder 120 and the axle shaft 110 can be quickly restored by rotating one or both of the magnet holder 120 and the axle shaft 110 relative to the other element until the interlocking relationship between the keyway protrusion 122 and the shaft keyway 111 is restored.

To prevent damage to the shaft collar 121, the holder web 125, and/or the web periphery 126, the shaft collar 121 may incorporate a collar slot 123 extending through the periphery of the shaft collar 121 adjacent to an expansion slot 124. The expansion slot 124 is an open aperture between the shaft collar 121 and the holder web 125 extending along a portion of the outer periphery of the shaft collar 121. In various embodiments, the collar slot 123 may be located approximately opposite the keyway protrusion 122 and/or adjacent to the expansion slot 124. In embodiments with the shaft keyway 111 or an axle shaft 110 with a non-round cross-section, the close conformation of the shaft collar 121 to the outer surface of the axle shaft 110 could result in damage if the axle shaft 110 over-rotates. The collar slot 123 prevents deformation or rupture of the shaft collar 121 by allowing the shaft collar 121 to expand into the area of the expansion slot 124 if the shaft axle 111 over-rotates and/or dislodges the keyway protrusion 122 from the shaft keyway 111. The expansion slot 124 also prevents over-expansion of the shaft collar 121.

While the magnet holder 120 has a substantially round configuration, a magnet extension 127 reaches out from the primarily round area of the holder web 125 to position the magnet assembly 130. The magnet extension 127 includes a magnet channel 128 having an internally stepped configuration, narrower in the center and wider in the outer ends. This internal configuration corresponds to the outer periphery of the magnet assembly 130 and serves to keep the magnet assembly 130 in place.

The magnet assembly 130 comprises two outer magnets 131a and 131b and an inner magnet 132. The diameters of the outer magnets 131a and 131b are larger than the diameter of the inner magnet 132, such that when assembled the magnet assembly 130 has a dual diameter cylindrical configuration to prevent axial translation within the magnet channel 128. When incorporated with the magnet holder 120, the inner magnet 132 is located within the narrow center of the magnet channel 128 and the outer magnets 131a and 131b in the outer ends. The exposed surfaces of the outer magnets 131a and 131b are substantially flush or slightly inset from the web periphery 126. The magnetic field strengths and pole orientations of the outer magnets 131a and 131b and the inner magnet 132 are sufficient that magnetic attraction keeps them in place in the magnet channel 128 without any additional adhesives or structures. If dislodged from the magnet channel 128, the magnet assembly 130 may be easily reassembled by placing the outer magnets 131a and 131b into contact with the inner magnet 132 in the magnet channel 128. A replacement procedure for the magnet assembly 130 may take the same course.

As can be seen in FIG. 3a, the sensor bracket 140 includes a shaft bore 141 for accommodating the axle shaft 110 and at least one sensor channel 143 for holding at least one magnetic sensor 150. A bracket web 142 extends between the shaft bore 141 and the sensor channel 143. The bracket web 142 also includes at least one anchor aperture 147 for accommodating at least one anchor assembly 160 to mount the sensor bracket 140 to a structure or other object.

In some embodiments, the magnetic sensor 150 is secured within the sensor channel 143 by an adhesive. In another embodiment, the outer surface of the sensor channel 143 has a truncated conical configuration, tapering as it extends from the bracket web 143. In another embodiment, at least one channel slot 144 extends through at least one side of the sensor channel 143 and, in some embodiments, into the bracket web 143.

In some embodiments, once the magnetic sensor 150 is inserted into the sensor channel 143 a retaining ring 145 may be placed around the outer periphery of the sensor channel 143 and moved towards the bracket web 142 to form an interference fit with the sensor channel 143, compressing the sensor channel 143 and holding the magnetic sensor 150 in place. In some embodiments, the retaining ring 145 has a plurality of retaining flanges 146 extending inwardly that may be angled and/or deformed to apply pressure on the sensor channel 143 and prevent the retaining ring 145 from backsliding. In some embodiments, the retaining ring 145 is threaded, with the outer surface of the sensor channel 143 having a complementary threading.

As can be seen in FIGS. 3b and 3c, the sensor bracket 140 is secured to a structure or other external object by means of at least one anchor assembly 160. The anchor assembly 160 includes a threaded shank 161 attached in some way to the external object, passing through a grommet 162 and then the anchor aperture 147. The grommet 162 is shown in its undeformed state 162a (FIG. 3b) and deformed state 162b (FIGS. 3b, 3c). A neck of the grommet 162 also passes through the anchor aperture. When a threaded nut 163 is threaded onto the shank 161 on the side of the anchor aperture 147 opposite the body of the grommet 162, the neck of the grommet 162 deforms and blocks a portion of the threading on a root of the shank 161, preventing the nut 163 from being over-tightened and being damaged or damaging the bracket web 142 through compressive and shearing forces.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A magnet holder device for use in a magnet holder and sensor bracket system, the device comprising:
   a shaft collar configured to conform to an outer surface of an axle shaft extending through the shaft collar;
   a holder web at least partially encircling the shaft collar;
   a magnet extension extending from the holder web;
   a magnet channel extending through the magnet extension; and
   a magnet assembly located within and extending through the magnet channel,
   wherein the magnet assembly comprises an inner magnet surrounded by two outer magnets,
   wherein a diameter of the inner magnet is smaller than a diameter of either of the two outer magnets.

2. The device of claim 1, further comprising a keyway protrusion extending into the interior of the shaft collar and interlocking with a shaft keyway extending along the axle shaft.

3. The device of claim 1, further comprising a collar slot extending through the periphery of the shaft collar.

4. The device of claim 3, further comprising a collar expansion slot adjacent the collar slot and between the shaft collar and the holder web.

5. The device of claim 4, wherein the shaft collar is expandable within the collar expansion slot.

6. The device of claim 1, wherein the magnet channel has an internally stepped configuration which is narrower in a center of the magnet channel than in the outer ends of the magnet channel.

7. The device of claim 6, wherein the inner magnet is located in the center of the magnet channel and the outer magnets are located in the outer ends of the magnet channel.

8. The device of claim 7, wherein the outer magnets and the inner magnet are kept in place in the magnet channel by magnetic attraction without any additional adhesives or structures.

9. A magnet holder and sensor bracket system, the system comprising:
   a magnet holder device comprising:
      a shaft collar configured to conform to an outer surface of an axle shaft,
      a holder web encircling the shaft collar, a magnet extension extending from the holder web,
a magnet channel extending through the magnet extension, and
a magnet assembly located within and extending through the magnet channel,
wherein the magnet assembly comprises an inner magnet surrounded by two outer magnets,
wherein a diameter of the inner magnet is smaller than a diameter of either of the two outer magnets; and
a sensor bracket device comprising:
a shaft bore, the axle shaft extending therethrough,
a bracket web encircling the shaft bore,
at least one sensor channel extending from the bracket web, and
at least one magnetic sensor located in the at least one sensor channel.

10. The system of claim 9, wherein the outer surface of the at least one sensor channel has a truncated conical configuration.

11. The system of claim 9, wherein at least one channel slot extends through a side of the at least one sensor channel.

12. The system of claim 11, wherein the at least one channel slot extends into the bracket web.

13. The system of claim 9, further comprising at least one retaining ring placed around an outer periphery of the at least one sensor channel to form an interference fit with the at least one sensor channel, compressing the at least one sensor channel and holding the at least one magnetic sensor in place.

14. The system of claim 13, wherein the at least one retaining ring comprises a plurality of retaining flanges extending inwardly.

15. The system of claim 13, wherein the at least one retaining ring comprises an inner thread, wherein an outer surface of the at least one sensor channel comprises a complementary threading.

16. The system of claim 9, wherein the at least one magnetic sensor is fixed in the at least one sensor channel by an adhesive.

17. The system of claim 9, further comprising at least one anchor assembly extending through at least one anchor aperture in the bracket web.

18. The system of claim 17, wherein the at least one anchor assembly comprises a threaded shank extending through a grommet, the anchor aperture, and a threaded nut, wherein a neck of the grommet is deformed into a root of the threaded shank.

* * * * *